United States Patent
Pröger et al.

Patent Number: 6,119,062
Date of Patent: Sep. 12, 2000

[54] BRAKING SYSTEM WITH ELECTRONIC BRAKING FORCE DISTRIBUTION

[75] Inventors: Thomas Pröger, Rodermark; Markus Zenzen, Hattersheim, both of Germany

[73] Assignee: Continental Teves AG & Co. OHG, Germany

[21] Appl. No.: 09/066,355
[22] PCT Filed: Apr. 10, 1997
[86] PCT No.: PCT/EP97/01768
§ 371 Date: Apr. 23, 1999
§ 102(e) Date: Apr. 23, 1999
[87] PCT Pub. No.: WO97/38881
PCT Pub. Date: Oct. 23, 1997

[30] Foreign Application Priority Data

Feb. 7, 1997 [DE] Germany ............ 196 14 908

[51] Int. Cl.[7] .................. G06F 7/70; G06F 19/00
[52] U.S. Cl. ............... 701/70; 701/78; 701/83; 303/155; 303/167
[58] Field of Search ............... 701/70, 71, 74, 701/78, 83; 303/155, 166, 167, 186

[56] References Cited

U.S. PATENT DOCUMENTS 5,927,830 7/1999 Tozu et al. ............ 303/155

FOREIGN PATENT DOCUMENTS

| | | |
|---|---|---|
| 0546948 | 6/1993 | European Pat. Off. |
| 3133442 | 3/1983 | Germany. |
| 3306611 | 8/1984 | Germany. |
| 4224971 | 2/1994 | Germany. |
| 4337498 | 5/1994 | Germany. |
| 4309243 | 9/1994 | Germany. |
| 4414980 | 11/1995 | Germany. |
| 2135413 | 8/1984 | United Kingdom. |

*Primary Examiner*—William A. Cuchlinski, Jr.
*Assistant Examiner*—Gertrude Arthur
*Attorney, Agent, or Firm*—Radar, Fishman & Grauer PLLC

[57] ABSTRACT

In a brake system with electronic brake force distribution, the electronic brake force distribution is deactivated as soon as the maximum vehicle deceleration achieved during electronic control falls below by a given factor between 0 and 1, for example, two thirds. The purpose is that an early exit from the electronic brake force distribution is effected even if the brake light switch is defective, with the result that unnecessary valve actuations and the risk of underbraking are prevented. The present invention is applicable to brake systems where the criteria for the activation of the electronic brake force distribution are independent of a brake light switch signal, and to other brake systems if there is a defect in the brake light switch. The present invention makes it possible to sense in good time that the driver has taken his/her foot off the brake pedal or no longer desires heavy deceleration.

5 Claims, 1 Drawing Sheet

BRAKING SYSTEM WITH ELECTRONIC BRAKING FORCE DISTRIBUTION

BACKGROUND OF THE INVENTION

The present invention relates to a brake system with electronic brake force distribution as it is disclosed, for instance, in German patent application No. 43 37 498. The prior art brake system adjusts the brake force applied to the rear wheel in relation to the brake force applied to the front wheel in order to ensure an ideal brake force distribution. Pressure control valves are arranged in a hydraulic circuit which connects the master cylinder of the brake system with the rear-wheel brakes. There is provision of an auxiliary-power source to furnish supply pressure and a hydraulic booster to adjust the braking pressure and to operate the master cylinder. Interposed between the master cylinder and the control valves is a change-over valve. The change-over valve is adapted to be selectively switched to adopt a first operating position which connects the control valves to the master cylinder and closes the connection between the control valves and the hydraulic booster, and to adopt a second operating position which connects the control valves to the hydraulic booster and closes the connection between the control valves and the master cylinder. When the change-over valve is switched from the first operating position to the second operating position, the control valves control the hydraulic pressure in the rear-wheel cylinders corresponding to the predetermined relation to the front-wheel braking pressure. The commencement of this control depends on whether a defined starting condition is satisfied or not. Defined criteria must be fulfilled: the brake light switch must be activated, the vehicle speed must have exceeded a determined threshold value, and the vehicle acceleration must have fallen below a determined negative threshold value. In addition, the wheel speed of the rear wheel, the braking pressure of which shall be controlled, must remain under the wheel speed of the front wheel on the same vehicle side by a defined amount. If these conditions are satisfied, the electronic brake force distribution will start to operate. Electronic brake force distribution will be disabled when either the brake light switch is deactivated (what means that the driver has removed his/her foot from the brake pedal), or the vehicle acceleration exceeds a negative threshold value of 0.25 g.

Electronic brake force distribution should be performed only when required. Therefore, a deactivation criterion which is independent of the position of the brake light switch is certainly an appropriate supplementation. However, the calculation of a vehicle acceleration at very low wheel speeds involves many errors because the wheel sensors do not produce exact values about the vehicle speed at low speeds. In this case, the deceleration-responsive criterion can be applied with a wide range of divergence only. Further, there are brake systems having starting conditions for an entry into the electronic brake force distribution which are independent of whether or not pedal-operated braking prevails. Thus, electronic brake force distribution will possibly be activated when the vehicle passes a bump or any other disturbance on the road surface which took effect on the individual wheel speed. With such activation criteria, it is necessary to choose deactivation criteria which are not linked to the release of a brake pedal. In rush hours, for example, it is possible that the driver has heavily decelerated the vehicle for a period of time during stop-and-go traffic and thereby triggered electronic brake force distribution. However, because the driver does not remove his/her foot from the brake pedal after partial braking, deactivation of electronic distribution depending on the brake light switch is rendered impossible. In addition, it may also occur that a defective brake light switch is not identified, or that it is not recognized due to a defective brake light switch that the driver has already terminated pedal-operated braking so that the duration of the electronic brake force distribution is unnecessarily long. This might be the case, for example, when a perceptible deceleration of the vehicle is caused by the engine stall torque without brake pedal application so that the acceleration threshold value is not exceeded.

In order to effect deactivation of electronic brake force distribution and to avoid unnecessary valve actuation also in such cases, an object of the present invention is to provide a brake system of the type referred to hereinabove which causes deactivation of electronic brake force distribution independently of the application of the brake pedal and independently of the exceeding of a given vehicle acceleration as soon as pressure decrease on the rear-axle brakes is not required.

BRIEF SUMMARY OF THE INVENTION

This object is achieved by a method in which the brake system discontinues the electronic brake force distribution already as soon as the vehicle acceleration has been considerably increased after a detected maximum deceleration, i.e., minimum vehicle acceleration. This means that the selected threshold value of vehicle acceleration is not invariable but responsive to the course of the braking operation. A so-called 'fast exit' permits deactivating the electronic brake force distribution as quickly as possible when electronic control is not necessary any longer. Braking pressure increase is ensured also on the wheel brakes of the rear axle when the brake pedal is applied or depressed further. Unnecessary valve activities are this way avoided. Such an exit functions both with an intact and a defective brake light switch, without the driver's brake pedal feel being impaired.

However, it should be ensured that the brake system is not in a phase of pressure decrease where a comparatively high amount of brake slip prevails on the rear axle. This is because when an exit from the electronic brake force distribution is effected at this time, there is the imminent risk that the rear wheels lock.

The exit criterion according to the present invention is especially appropriate at vehicle speeds which exceed walking speed. At low speeds, the vehicle speed and, thus, the acceleration calculated from the vehicle speed is relatively susceptible to errors.

When the threshold of exit from the electronic brake force distribution lies at roughly the half of, up to four fifth of, the maximum deceleration, i.e., the minimum acceleration during the braking operation, it is ensured that in the partial braking range the risk of underbraking of the vehicle due to closed inlet valves on the rear axle is avoided. When the inlet valves on the rear axle are closed, higher pedal forces are necessary to achieve the desired vehicle deceleration only by the brake force of the front wheels. Braking operations of this type cause an increased lining wear on the wheel brakes of the front axle.

BRIEF DESCRIPTION OF THE DRAWINGS

The above objects, features, and advantages of the present invention can be best understood from the following detailed description of the invention when considered with the accompanying only FIGURE of drawings, in which a flow chart illustrating the operation is shown.

DETAILED DESCRIPTION OF THE INVENTION

Figure 1:
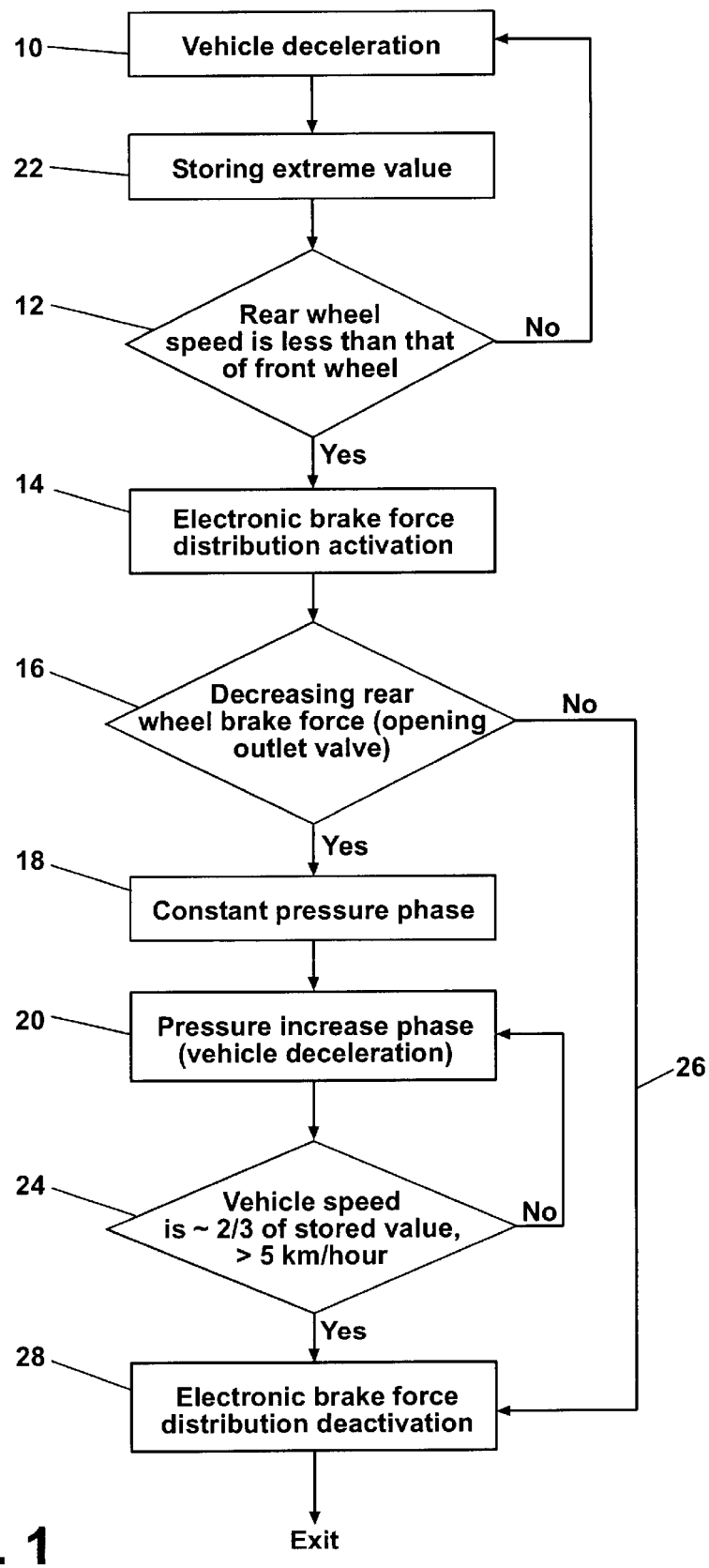

One embodiment of the present invention is described in the following. It shall be assumed that in a brake system the electronic brake force distribution is activated irrespective of the signal of the brake light switch. This will usually occur due to a given vehicle deceleration (block 10 of the FIGURE) where at least one rear wheel moves too slowly in comparison with the vehicle reference speed or the speed of the front wheel ahead of the said rear wheel (lozenge 12). Thus, the brake system enters the electronic brake force distribution (block 14) and decreases the braking pressure on the rear wheel concerned (lozenge 16), for example, by opening an outlet valve. Following the stabilization of the rotational wheel speed of the rear wheel concerned is a phase where the pressure is maintained constant (block 18) and, later, a phase of pressure increase (block 20). It shall further be assumed that the brake light switch of the vehicle was damaged prior to braking or during braking.

In this event, it would be impossible for a brake system of the state of the art to find out whether the driver has meanwhile removed his/her foot from the brake pedal as long as the vehicle acceleration has not yet exceeded a negative threshold value of a very small rate. The criterion that a change of the brake light switch signal is detected is not applicable now because the brake light switch is defective. Thus, electronic brake force distribution in brake systems of the state of the art lasts for an unnecessarily long period and causes a large number of valve actuations. Also, additional braking pressure increase by a pedal-operated braking operation is not possible when the inlet valves are closed. The present invention prevents this condition because the vehicle deceleration, i.e. the negative vehicle acceleration, is sensed during electronic control of brake force distribution. The extreme value is stored (block 22). In the event that the vehicle deceleration has been decreased to roughly two third of the maximum deceleration (lozenge 24) and in the absence of a phase of pressure decrease at this time (logic connection 26), the electronic brake force distribution is discontinued (block 28). The reason is that it is this way detected at an early time that the driver has stopped depressing the brake and a rapid exit from the electronic brake force distribution may occur. However, an exit of this type is advisable only at vehicle speeds at a rate of more than 5 km/h. At lower speeds, such a criterion should not be applied because when stopping the vehicle, for example, in front of a traffic light, and with continued application of the brake pedal, the brake pedal will suddenly move through its full travel because all inlet valves are abruptly opened.

In addition, as the minimum deceleration a threshold of 0.4 g or, in other words, a maximum vehicle acceleration of −0.4 g is advisable in order to apply the exit criterion of the present invention. The vehicle acceleration at low values is certainly subject to a divergence of 0.1 g. When the maximum acceleration for the application of the exit criterion of the present invention is in the amount of −0.3 g, for example, it would be possible that the exit caused by the divergence occurs at −0.2 g, i.e., when the actual minimum acceleration amounts to −0.3 g only. However, this means that the vehicle has never been greatly decelerated during braking and a heavy braking operation could still follow in which the electronic brake force distribution remains necessary.

What is claimed is:

1. A method for deactivating an electronic brake force distribution which varies braking pressure of rear-axle brakes of a vehicle according to an electronic control algorithm, wherein the electronic brake force distribution distinguishes at least between phases of pressure increase and phases of pressure decrease, the method including a step of deactivating the electronic brake force distribution as soon as the vehicle acceleration exceeds $k * a_{min}$, wherein k is a factor $0 \leq k < 1$ and $a_{min}$ is the minimum vehicle acceleration occurring during electronic brake force distribution.

2. A method as claimed in claim 1, wherein the deactivation is prevented when the electronic brake force distribution is in a phase of pressure decrease.

3. A method as claimed in claim 1, wherein the deactivation occurs only if speed of the vehicle exceeds a defined minimum value.

4. A method as claimed in claim 3, wherein the defined minimum value ranges between 4 and 10 km/h.

5. A method as claimed in claim 1, wherein k ranges between 0.5 and 0.8.

\* \* \* \* \*